Figure 1:
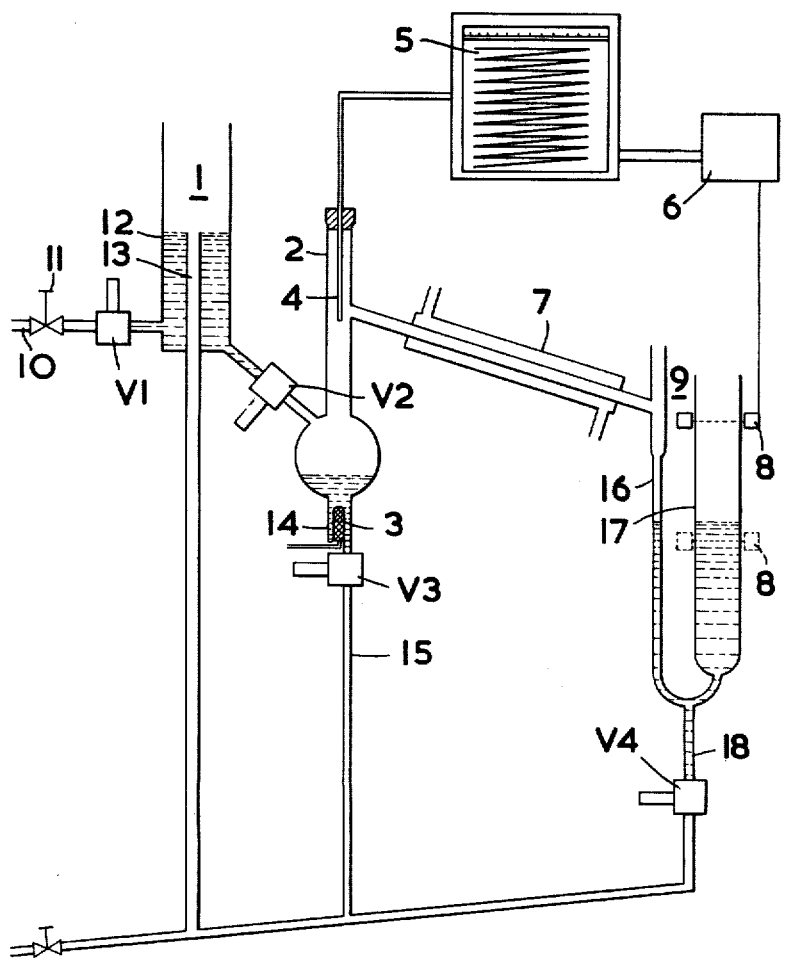

June 18, 1963 W. H. TOPHAM 3,094,468
APPARATUS FOR USE IN THE CONTROL OF DISTILLATION
Filed Feb. 9, 1961 4 Sheets-Sheet 1

Inventor:
William Henry Topham
By: Morgan, Finnegan, Durham & Pine
Attorneys.

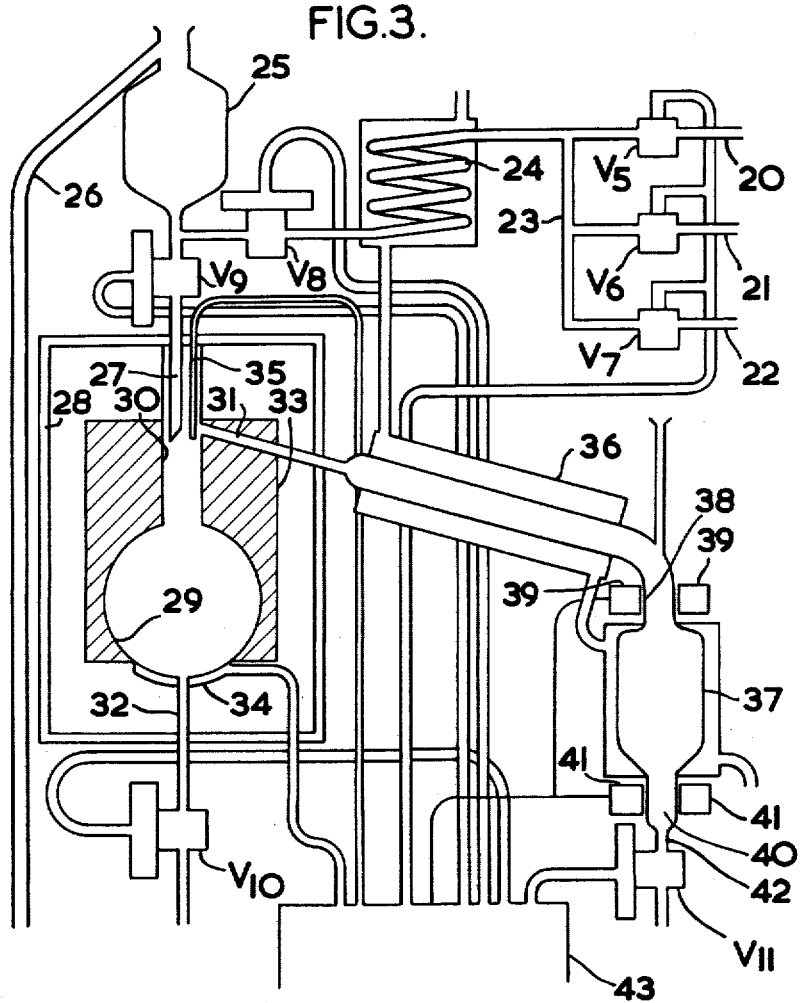

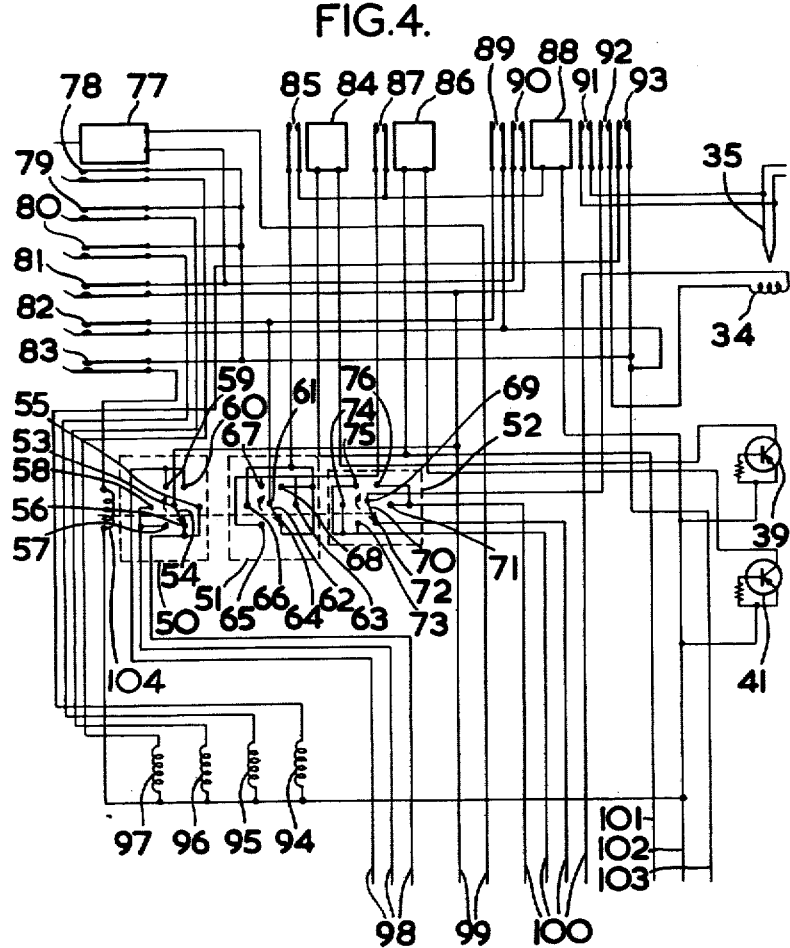

United States Patent Office 3,094,468
Patented June 18, 1963

3,094,468
APPARATUS FOR USE IN THE CONTROL OF
DISTILLATION
William Henry Topham, Isle of Grain, England, assignor to The British Petroleum Company Limited, London, England, a joint-stock corporation of Great Britain
Filed Feb. 9, 1961, Ser. No. 88,104
Claims priority, application Great Britain Feb. 11, 1960
5 Claims. (Cl. 202—160)

This invention relates to apparatus suitable for use in the control of a continuous distillation process.

In the large scale continuous distillation of feedstocks which contain many components and which, in consequence, boil over a range of temperatures, small variations in the nature and proportions of components will tend to produce variations in the boiling ranges of the distillation products; these variations will normally be compensated or off set by adjustment of the distillation conditions, usually by control of through-put or product withdrawal or by control of the heat input to the distillation column, or through variation in the amount of heat withdrawal, by control of reflux proportions and temperature. These adjustments are made on the basis of an analysis of the feedstock and/or at least certain of the products; usually this analysis includes a batch laboratory distillation of periodic samples to determine the distillation temperatures after the distillation of fixed proportions by volume of the sample. Laboratory instruments are available which will carry out automatically the standard IP 123 and ASTM D-86 distillation tests, but such instruments are both complex and costly and each distillation must be initiated and terminated by an operator.

For control by volatility of continuous distillation of many products it is sufficient to determine a single point on the IP or ASTM distillation curve of a periodic sample.

My co-pending British patent application 17963/58 describes an apparatus and method of test developed on this basis, the apparatus comprising a laboratory scale batch distillation unit having means, responsive to temperature, whereby heating is cut off automatically at a predetermined still overhead temperature.

It is an object of this invention to provide improved apparatus suitable for use in the control of continuous distillation. It is a further object to provide automatic sampling and monitoring equipment which will determine one or more points on the IP or ASTM distillation curves for samples of any liquid product suitable for distillation by IP or ASTM methods.

According to one aspect of the present invention there is provided apparatus, suitable for use in the control of a continuous distillation process, comprising (a) a distillation still, heated by an electrical heater, the still having electrical means responsive to overhead temperature in the still for producing a signal (A) relating to the overhead temperature, (b) a condenser connected to the still head and (c) a distillate receiver connected to the condenser, the receiver having a liquid level detector, responsive to the volume of distillate contained in the receiver, for producing a signal (B) when the level of distillate in the receiver reaches a predetermined level.

According to another aspect of the invention there is provided apparatus, suitable for use in the control of a continuous distillation process comprising (a) a sample introduction system, (b) a distillation still, heated by an electrical heater, the still having electrical means responsive to overhead temperature in the still for producing a signal (A) relating to the overhead temperature and having a drainage limb controlled by a valve, (c) a condenser connected to the still head and (d) a distillate receiver connected to the condenser, the receiver having a liquid level detector responsive to the volume of distillate contained in the receiver for producing a signal (B) when the level of distillate in the receiver reaches a predetermined level and having a drainage limb controlled by a valve.

Preferably the signal (A) may take the form of a continuous current of variable strength. Preferably the signal B may take the form of a current ceasing to flow, but the signal B may alternatively take the form of a current starting to flow, or of a current of one strength changing to a current of another strength or of a single pulse.

Preferably the sample introduction system comprises a cell having a cell inlet valve and a cell outlet valve and a weir discharge whereby a constant level of liquid may be maintained within the cell.

Preferably the apparatus comprises a relay adapted to switch off the electrical heater on receipt by the relay of signal B.

Preferably the electrical means comprises a thermocouple set in the still head and connected to a temperature recorder.

Preferably a switch is connected across the thermocouple, the switch being adapted to be closed by the relay on receipt by the relay of signal B.

The maximum temperature recorded during a distillation is therefore the temperature at which the predetermined volume of distillate is recovered by the receiver as detected by the liquid level detector.

Preferably the apparatus comprises a sequence controller actuated by the signal B from the liquid level detector and controlling the operation of the heater, the thermocouple, the switch and the valves in such manner that the following series of operations (1) draining the receiver, (2) flushing the still, (3) charging the still with sample, (4) switching on the heater and switching on the thermocouple, (5) distilling the sample until a preselected volume of distillate has collected in the receiver and (6) switching off the heater and switching off the thermocouple, is carried out on a cyclic basis, each cycle of operations being initiated by the termination of a previous cycle resulting in the production of signal B. Conveniently the sequence controller is adapted to remain in a zero position after switching on the heater until triggered by signal B from the liquid level detector.

According to a further aspect of the invention there is provided apparatus, as hereinbefore described, adapted to sample a plurality of liquid product streams, comprising a sample inlet manifold connected directly or indirectly to the cell inlet valve, the sample inlet manifold also being connected to a plurality of sampling lines, each sampling line being controlled by a valve controlled by the sequence controller.

Preferably the sequence controller comprises a motor driven rotary cam operated switching mechanism.

Conveniently the liquid level detector is slidably mounted on an axis parallel to the main axis of the receiver or on the main axis of the receiver and may be set to a position on an indicator scale corresponding to a desired volume of distillate to be collected in the receiver.

Preferably the liquid level detector comprises a photoelectric cell mounted in such manner that a photo-electric circuit is made through and across the distillate receiver, the photo-electric circuit being breakable by a rising liquid level in the distillate receiver.

Suitably the liquid level detector comprises an electrical capacity probe mounted in such manner that a rising liquid level in the distillate receiver causes the capacity of an electrical system to increase.

If desired, the apparatus may comprise a plurality of liquid level detectors, each being set in a preselected position to detect a preselected liquid level, each being adapted to produce a signal (B) when the level of distillate in the receiver reaches the level corresponding to the position of the detector.

The apparatus is suitable for use in the control of continuous distillation of wide boiling range fractions and is particularly suitable for the control of the distillation of petroleum and fractions of petroleum origin. Test samples which may be employed for control in the distillation of crude petroleum are:

(a) Straight run benzine
(b) Naphtha cut
(c) Kerosene cut
(d) Light gas oil cut

Figure 2:
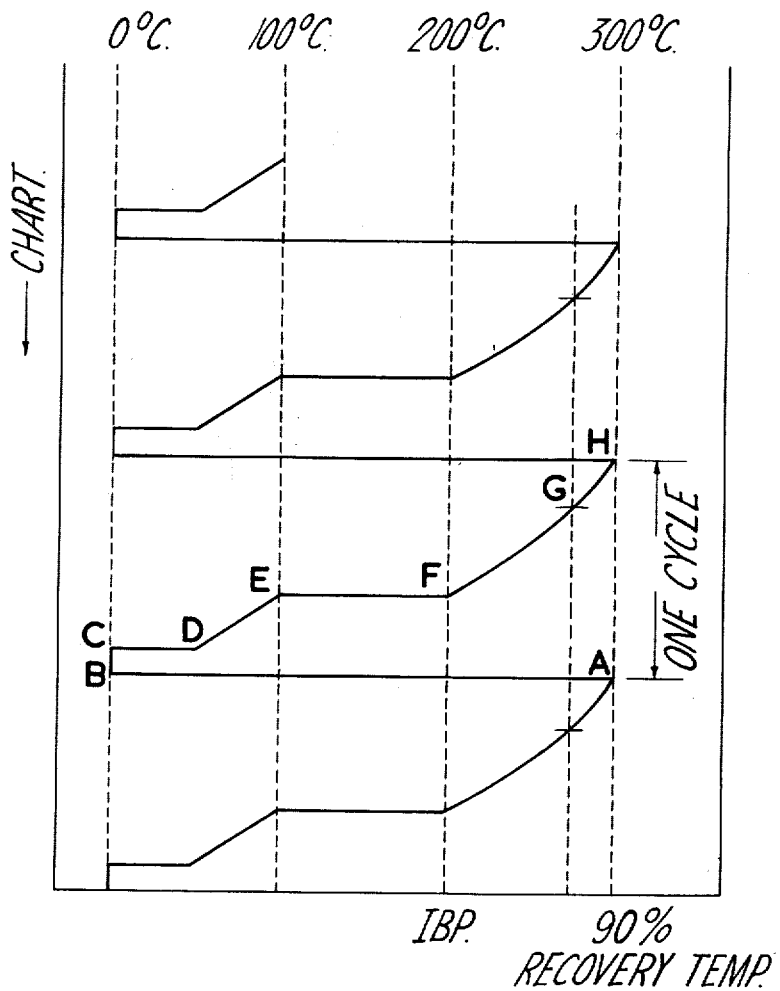

The invention is illustrated by but not limited with reference to the accompanying FIGURES 1, 2, 3 and 4, wherein FIGURE 1 is a diagrammatic representation of apparatus according to the invention, FIGURE 2 is a representation of a section of a typical temperature-time chart as drawn by the temperature recorder of apparatus according to the invention, FIGURE 3 is a diagrammatic representation of a modified form of apparatus according to the invention, suitable for sampling and monitoring three streams of liquid product and FIGURE 4 is a circuit diagram of the apparatus described with reference to FIGURE 3.

With reference to FIGURE 1:

The apparatus consists of a constant volume sampler 1, a distillation flask 2, an electric heater 3, a thermocouple 4, a temperature recorder 5, a sequence controller 6, a condenser 7, photo-electric meniscus detectors 8 and a distillate receiver 9.

Liquid feed enters the apparatus through the line 10 and may be shut off therefrom by the valve 11. Feed then passes through a solenoid valve $V_1$ into the sampler 1 which comprises a cell 12 and a weir 13 over which excess sample flows to drain. The outlet of the sampler 1 is controlled by a solenoid valve $V_2$ and leads to the inlet of the flask 2 which is fashioned with a drain well 14 forming a pocket into which the heater 3 fits. The well 14 is of such size that the heater pocket is fully immersed by sample when the flask 2 contains only 5% of its normal sample charging volume. A limb 15 controlled by a solenoid valve $V_3$ drains the well 14. The thermocouple 4 is mounted in the neck of the flask 2 and is connected to the temperature recorder, 5. The outlet of the flask 2 is connected to the condenser 7 which in turn is connected to a limb 16 of the distillate receiver 9. The receiver 9 comprises a U-tube consisting of the limb 16, a limb 17 across which the photo-electric meniscus detectors 8 complete their circuit and a drainage limb 18 controlled by a solenoid valve $V_4$. The sequence controller 6 comprises a synchronous motor driven rotary switching device for controlling the operations of the solenoid valves $V_1$, $V_2$ $V_3$ $V_4$, the heater 3 and the thermocouple 4.

The following sequence of events is triggered by the breaking of the photo-electric circuit across the detectors 8 by the rising distillate meniscus in the receiver limb 17.

(1) Heater 3 is switched off.
    Thermocouple 4 is switched off.
(2) Valve $V_4$ opens to drain the receiver 9.
    Valve $V_1$ closes to shut off feed from the sampler 1.
    Valve $V_2$ opens to admit sample to cool and flush flask 2.
(3) Valve $V_2$ closes to isolate flask 2 from sampler 1.
    Valve $V_1$ opens to refill sampler 1.
    Valve $V_3$ opens to drain flask 2.
(4) Valve $V_3$ closes to render flask 2 ready for charging.
    Valve $V_4$ closes to render receiver 9 ready for collecting.
    Valve $V_1$ closes to shut off feed from samper 1.
    Valve $V_2$ opens to admit sample to flask 2.
(5) Valve $V_2$ closes to isolate flask 2 from sampler 1.
    Valve $V_1$ opens to refill sampler 1.

Thermocouple 4 is switched on.
Heater 3 is switched on.
Sequence controller 6 stops in a zero position.

With reference to FIGURE 2:

FIGURE 2 represents a section of a typical temperature-time chart as determined by a thermocouple-actuated temperature recorder during the distillation of a series of samples of a liquid product whose 90% distillate recovery temperature was determined. One complete cycle of operations is represented by the line ABCDEFGH which is interpreted as follows:

At point A, representing the point at which a previous distillation terminated, the thermocouple is switched off, thus causing the temperature recorder to give a zero reading, as indicated at point B. Zero is recorded until the thermocouple is switched on at point C, whereupon ambient temperature, represented by point D, is recorded. Point D also represents conditions at which heat is initially supplied to a sample. Point E represents conditions as the sample begins to boil, point F conditions as vapours reach the thermocouple junction, point G conditions at an intermediate stage in the distillation and point H conditions at 90% distillate recovery. At point H the thermocouple is switched off again and the cycle is recommended.

With reference to FIGURE 3:

A line 20 is provided through which a first stream of sample may enter the apparatus, a line 21 through which a second stream may enter and a line 22 through which a third stream may enter. Solenoid operated stream selector valves $V_5$, $V_6$ and $V_7$ are set in lines 20, 21 and 22 respectively, the lines 20, 21 and 22 being connected to a manifold 23 downstream of the valves $V_5$, $V_6$ and $V_7$. The manifold 23 leads to a sample cooler 24 which is connected by means of a pneumatically operated solenoid controlled valve $V_8$ to a sample burette 25 in which a constant volume of sample may be maintained by means of a drainage arm 26 through which excess sample flows to drain. The sample burette 25 is fitted with an outlet 27 controlled by a pneumatically operated solenoid controlled valve $V_9$. A metal flask 29 contained within a casing 28, comprises a neck 30 sealed to the casing 28, a side arm 31 penetrating through the casing 28 and a drainage limb 32 also penetrating through the casing 28, the drainage limb 32 being controlled by a pneumatically operated solenoid controlled valve $V_{10}$. The flask 29 is surrounded by lagging 33 and is heated by an electrical heater 34. A thermocouple 35 is situated in the neck 30 of the flask 29 and is connected to a temperature recorder (not shown).

The outlet 27 of the burette 25 passes through the casing 28 into the neck 30 of the flask 29.

The side arm 31 of the flask 29 is connected outside the casing 28 to a cooled condenser 36 which in turn is connected to cooled receiver 37, having an upper portion 38 across which is set a photo-electric meniscus detector 39 and having a lower portion 40 across which is set a photo-electric meniscus detector 41. The photo-electric meniscus detectors 39 and 41 are set to detect the levels corresponding to the recovery of 90% and 10% by volume respectively of a sample which has been distilled. The receiver 37 is fitted with a drainage limb 42 controlled by a pneumatically operated solenoid controlled valve $V_{11}$.

Coolant is supplied to the distillate receiver 37 and the sample cooler 24 in such manner that the temperature of distillate when contained in the receiver 37 is substantially equal to the temperature of sample when contained in the burette 25.

A control unit 43, to be more fully described with reference to FIGURE 4, comprises a selector switch for controlling the operation of the stream selector valves $V_5$, $V_6$ and $V_7$ and a synchronous motor driven rotary switching device for controlling the operation of the valves $V_8$, $V_9$, $V_{10}$ and $V_{11}$, the heater 34 and the thermocouple 35.

With reference to FIGURES 3 and 4:

The control unit 43 comprises a stream selector switch 50, a detector selector switch 51 and a heater voltage selector switch 52.

The stream selector switch 50 comprises a contact 53 connectable by means of a rotating arm 54 to six contacts 55, 56, 57, 58, 59 and 60. When contacts 53 and 55 or 56 are connected and a voltage is applied across 98 and 99, the stream selector valve $V_5$ opens, the stream selector valves $V_6$ and $V_7$ being or remaining closed. Similarly when contacts 53 and 57 or 58 are connected the stream selector valve $V_6$ opens, the stream selector valves $V_5$ and $V_7$ being or remaining closed and when contacts 53 and 59 or 60 are connected the stream selector valve $V_7$ opens, the stream selector valves $V_5$ and $V_6$ being or remaining closed.

The detector selector switch 51 comprises a contact 61 connectable by means of a rotating arm 62 to six contacts 63, 64, 65, 66, 67 and 68. Contacts 64, 66 and 68 are connected to contacts 85 and contacts 63, 65 and 67 to contacts 87.

The voltage selector switch 52 comprises a contact 69 connectable by means of a rotating arm 70 to six contacts 71, 72, 73, 74, 75 and 76, connected to sources of current at 100. When contacts 69 and 72 are closed a potential difference of 25 volts may be applied across the heater 34 which has a resistance of 15 ohms, when contacts 69 and 77 or 74 or 75 are closed a voltage of 32 volts may be applied and when contacts 69 and 76 or 71 are closed a voltage of 40 volts may be applied.

The control unit also comprises a synchronous motor, 77 driving a shaft (not shown) on which are mounted six cams (not shown) for making and breaking the contacts, 78, 79, 80, 81, 82 and 83 respectively; a primary relay 84 energised by the detector 39 and controlling the contacts 85; a primary relay 86 energised by the detector 41 and controlling the contacts 87; a main relay 88, controlled by the primary relay 84 or 86 and contacts 82, and controlling the contacts 89, 90, 91, 92 and 93.

A voltage of −12 volts is applied across 101 and 102; a voltage of +50 volts is applied across 102 and 103.

In use, with the arm 54 in the position shown in FIGURE 3 the stream selector valve $V_5$ is open, with the arm 62 in the position shown the primary relay contacts 85 are connected to the main relay 88. When a rising meniscus in the receiver 37 cuts the light beam of the detector 39 the primary relay 84 is de-energised, thereby opening the contacts 85 and de-energising the main relay 88. When the main relay 88 is de-energised the contacts 92 are opened thereby switching off the heater 34; the contacts 91 are closed thereby shorting out the thermocouple 35; the contacts 93 are closed thereby energising the coil 94 which opens the valve $V_{11}$; the contacts 90 are closed thereby starting the motor 77; the contacts 89 are thereby holding the relay 88 in a de-energised condition although the primary relay 84 will have been re-energised by the resumption of current flowing in the photo-electric circuit of the detector 39, the relay 84 thereby closing the contacts 85.

The cams driven by the motor 77 are designed in such manner that the following sequence occurs when the motor 77 is started:

(i) Contacts 78 are closed thereby energising the coil 97 which opens the valve $V_8$ which permits the flask 29 to fill.

(ii) Contacts 80 are closed thereby energising the coil 95 which opens the valve $V_{10}$ which permits the flask 29 to drain.

(iii) Contacts 78 are opened thereby de-energising the coil 97 which closes the valve $V_9$ which permits the burette 25 to fill to overflowing.

(iv) Contacts 80 are opened thereby de-energising the coil 95 which closes the valve $V_{10}$.

(v) Contacts 79 are opened thereby de-energising the coil 96 which closes the valve $V_8$.

(vi) Contacts 78 are closed thereby energising the coil 97 which opens the valve $V_9$ which permits a sample to enter the flask 29.

(vii) Contacts 78 are opened thereby de-energising the coil 97 which closes the valve $V_9$.

(viii) Contacts 83 are closed momentarily, thereby energising the impulse coil 104 which moves the rotating arms 54 and 62 on to the contacts 57, and 65, respectively, thereby connecting into the circuit the stream selector valve $V_6$ and primary relay contacts 87 and cutting out of the circuit the stream selector valve $V_5$ and primary relay contacts 85. The impulse coil 104 also moves the rotating arm 70 to select a heater voltage appropriate to the sample which is to be distilled.

(ix) The contacts 81 are closed, thereby shorting out the contacts 90.

(x) The contacts 82 are momentarily closed, thereby shorting out the contacts 89 whereupon the primary relay 86 energises the main relay 88 through the contacts 87. When the main relay 88 is energised the contacts 92 are closed thereby switching on the heater 34; the contacts 91 are opened thereby cutting in the thermocouple 36; the contacts 93 are opened thereby de-energising the coil 94 which closes the valve $V_{11}$; the contacts 90 are opened, but, since the contacts 90 are shorted out by closed contacts 81 the motor 77 continues to run; the contacts 89 close, thereby holding the relay 88 in an energised position.

(xi) Contacts 81 are opened, thereby cutting off the supply of current to the motor 77.

(xii) Contacts 79 are closed, thereby energising the coil 96 which opens the valve $V_8$.

It will be understood that the above values of potential differences and resistance are given by way of illustration only and that other suitable values might be employed if desired.

I claim:

1. Apparatus, suitable for use in the control and monitoring of a continuous distillation process, comprising, in combination: a sample introduction system including a cell having an inlet and an outlet, said cell also having a weir discharge within said cell whereby a constant level of fluid may be maintained within said cell; a first valve connected to said inlet of said cell for controlling the admission of fluid into said cell, and a second valve connected to said outlet of said cell for controlling the discharge of fluid from said cell; a distillation still having a still head; said still communicating with said cell through said second valve, whereby fluid contents within said cell pass into said still when said second valve is opened; a heater contiguous to said still for heating said still; said still having electrical sensing means for sensing the overhead temperature in said still and adapted to produce a first signal in response to overhead temperatures; said electrical sensing means including a thermocouple set in said still head and a temperature recorder electrically coupled with said thermocouple to receive said first signal; said still also having a drainage limb and a third valve therein; a condenser cannected to the said still head; a distillate receiver connected to said condenser, said receiver having liquid level detector means responsive to the volume of distillate collected in said receiver for producing a second signal as a function of the level of distillate in said receiver; said receiver also having a drainage limb and a fourth valve therein; relay means electrically coupled to said level detector means and responsive to said second signal, said relay means including a first switching means electrically coupled to said heater for deenergizing same upon receipt of said second signal from said level detector means, and a second switching means electrically coupled to said thermocouple and also responsive to said second signal to switch off said thermocouple.

2. Apparatus according to claim 1, including a sequence controller connected to a source of power and having a switching mechanism interconnected with said electrical heater, thermocouple, electrical sensing means, level detector means, relay means, and first, second, third and fourth valves for cyclically operating said electrical heater, thermocouple, electrical sensing means, relay means, and first, second, third and fourth valves upon receipt of said second signal, such that the following series of operations are initiated: (1) draining the receiver, (2) flushing the still, (3) charging the still with sample, (4) energizing said heater and said thermocouple, (5) distilling the sample until a pre-selected volume of distillate has collected in the receiver, and (6) de-energizing said heater and said thermocouple, each said cycle being initiated by the termination of a previous cycle resulting in the production of said second signal.

3. Apparatus according to claim 2, adapted to sample a plurality of liquid product streams, comprising a sample inlet manifold connected to the cell inlet valve, the sample inlet manifold also being connected to a plurality of sampling lines, each said sampling line being controlled by a valve controlled by the sequence controller.

4. Apparatus according to claim 2 wherein the switching mechanism of said sequence controller includes a motor driven rotary cam.

5. Apparatus according to claim 1 wherein the liquid level detector comprises an electrical capacity probe mounted such that a rising liquid level in the distillate receiver causes the capacity of an electrical system to increase.

References Cited in the file of this patent

UNITED STATES PATENTS

| | | |
|---|---|---|
| 994,431 | Unger | June 6, 1911 |
| 1,043,305 | Duensing | Nov. 5, 1912 |
| 1,231,857 | Crispell | July 3, 1917 |
| 1,673,374 | Peters | June 12, 1928 |
| 1,863,346 | Moore et al. | June 14, 1932 |
| 1,953,716 | Josten | Apr. 3, 1934 |
| 2,388,931 | Nelson | Nov. 13, 1945 |
| 2,851,404 | Jackson et al. | Sept. 9, 1958 |
| 2,882,693 | Clay | Apr. 21, 1959 |
| 2,971,896 | Curl | Feb. 14, 1961 |

FOREIGN PATENTS

| | | |
|---|---|---|
| 716,121 | France | Dec. 15, 1931 |
| 833,165 | France | Oct. 13, 1938 |

UNITED STATES PATENT OFFICE
CERTIFICATE OF CORRECTION

Patent No. 3,094,468　　　　　　　　　　　　　　　June 18, 1963

William Henry Topham

It is hereby certified that error appears in the above numbered patent requiring correction and that the said Letters Patent should read as corrected below.

Column 4, line 26, for "recommended" read -- recommenced --; column 6, line 61, for "cannected" read -- connected --.

Signed and sealed this 14th day of January 1964.

(SEAL)
Attest:

ERNEST W. SWIDER
Attesting Officer

EDWIN L. REYNOLDS

Acting Commissioner of Patents